(12) United States Patent
Gerdes et al.

(10) Patent No.: US 8,724,640 B2
(45) Date of Patent: May 13, 2014

(54) METHOD FOR OPERATING A DISTRIBUTED COMMUNICATIONS NETWORK

(75) Inventors: Christoph Gerdes, München (DE); Claus Kern, Altdorf (DE); Christian Kleegrewe, Eching (DE); Sebnem Rusitschka, Munich (DE); Alan Southall, Walldorf (DE)

(73) Assignee: Siemens Aktiengesellschaft, München (DE)

( * ) Notice: Subject to any disclaimer, the term of this patent is extended or adjusted under 35 U.S.C. 154(b) by 494 days.

(21) Appl. No.: 12/677,876

(22) PCT Filed: Aug. 27, 2008

(86) PCT No.: PCT/EP2008/061191
§ 371 (c)(1),
(2), (4) Date: Mar. 12, 2010

(87) PCT Pub. No.: WO2009/037074
PCT Pub. Date: Mar. 26, 2009

(65) Prior Publication Data
US 2010/0303089 A1    Dec. 2, 2010

(30) Foreign Application Priority Data

Sep. 13, 2007  (DE) .......................... 10 2007 043 652

(51) Int. Cl.
*H04L 12/28*    (2006.01)
*H04L 29/06*    (2006.01)
(52) U.S. Cl.
CPC .................................... *H04L 63/065* (2013.01)
USPC .......................................... 370/401; 710/316

(58) Field of Classification Search
USPC .......................... 370/401, 389, 254, 257, 338
See application file for complete search history.

(56) References Cited

U.S. PATENT DOCUMENTS

| | | |
|---|---|---|
| 2004/0249970 A1 | 12/2004 | Castro |
| 2005/0117525 A1* | 6/2005 | Poustchi et al. ............... 370/254 |
| 2006/0126611 A1* | 6/2006 | Kelly et al. .................... 370/389 |
| 2006/0222086 A1* | 10/2006 | Frye, Jr. ........................ 375/257 |
| 2008/0037485 A1* | 2/2008 | Osinga et al. ................. 370/338 |

FOREIGN PATENT DOCUMENTS

| | | |
|---|---|---|
| DE | 10229636 A1 | 1/2004 |
| DE | 102006021591 B3 | 4/2007 |

OTHER PUBLICATIONS

Stoica, I.: Morris, R.; Karger, D.; D?Kaashoek, M. F.; Balakrishnan, H.; Chord: A Scalable Peer-to-peer Lookup Service for Internet Applications; Aug. 27-31, 2001; pp. 1-12; SIGCOMM 01, San Diego, ACM 1-58113-411-8/01/0008.

* cited by examiner

*Primary Examiner* — Dang Ton
*Assistant Examiner* — Lionel Preval

(57) ABSTRACT

A method for operating a dezentralized communication network with network nodes is provided. The method is based on protocols in conventional peer-to-peer networks. The method provides rapid searching of resources whereby each network node manages a table containing information regarding all the other network nodes, such that a network that contains the resource is immediately retrieved among the table entries. Furthermore, the table contains device names of technical components on which the network nodes are mapped, so that a technical component is directly addressed also via its device name without use of the search process.

19 Claims, 8 Drawing Sheets

| IED_Name | P_ID | IP_ADDR | SB |
|---|---|---|---|
|  | 1 |  | 255 |
|  | 2 |  | 255 |
|  | 3 |  | 255 |
|  | 4 |  | 255 |
|  | 5 |  | 255 |
|  | 6 |  | 255 |
|  | 7 |  | 255 |
|  | 8 |  | 255 |

T1'

| IED_Name | P_ID | IP_ADDR | SB |
|---|---|---|---|
| E1Q1SB1 | 1 | 192.168.1.1 | 0 |
|  | 2 |  | 255 |
|  | 3 |  | 255 |
| E2Q1SB1 | 4 | 192.168.1.12 | 0 |
|  | 5 |  | 255 |
|  | 6 |  | 255 |
| E1Q2SB1 | 7 | 192.168.1.2 | 0 |
| E3Q1SB2 | 8 | 192.168.1.43 | 1 |

METHOD FOR OPERATING A DISTRIBUTED COMMUNICATIONS NETWORK

CROSS REFERENCE TO RELATED APPLICATIONS

This application is the US National Stage of International Application No. PCT/EP2008/061191 filed Aug. 27, 2008, and claims the benefit thereof. The International Application claims the benefits of German Application No. 10 2007 043 652.3 DE filed Sep. 13, 2007. All of the applications are incorporated by reference herein in their entirety.

FIELD OF INVENTION

The invention relates to a method for operating a distributed communications network having a multiplicity of network nodes, and also to a corresponding communications network.

SUMMARY OF INVENTION

Distributed communications networks are used, for example, as peer-to-peer networks for exchanging data, where a multiplicity of network nodes self-manage themselves in a decentralized manner without the intermediary of a server. Suitable protocols, which are used to create a logical structure of network nodes, are employed to operate such distributed networks. Known peer-to-peer protocols, such as Gnutella, are used for user terminals, in particular PCs or mobile communications devices, to communicate over the Internet in order to publish and search for data.

It is desirable to use distributed data networks also in the field of industrial engineering systems. Nowadays, engineering systems are often implemented as "embedded systems", in which the individual components of the system have intelligence in the form of a processor and a communications module for communicating with other components of the engineering system. It is suitable to use appropriate distributed data networks for these systems, because each component of the system can communicate autonomously with other components. Using conventional peer-to-peer protocols in industrial applications, however, has the disadvantage that the mechanisms used in conventional protocols for publishing and locating resources often do not satisfy industrial requirements relating to the communication speed between the devices.

An object of the invention is to create a method for operating a distributed communications network that ensures rapid and reliable communication between the individual network nodes.

This object is achieved by the independent claims. Developments of the invention are defined in the dependent claims.

The method according to the invention is used to operate a communications network having a multiplicity of network nodes, with each network node being assigned an identity value from a range of identity values, and an address for the respective network node to communicate with other network nodes, and each network node being responsible for a sub-range of identity values from the range.

In the method according to the invention, each operational network node manages a table, which contains an entry for each of at least the operational network nodes in the communications network, said entry comprising at least the identity value and the address of the respective network node. In a preferred version, the table constitutes a hash table containing corresponding hash values from a hash value range. The address of the individual network nodes in the table is preferably a network address, such as an IP address or a MAC address for instance.

In the method according to the invention, each operational network node regularly sends activity messages to the other network nodes of the communications network, with the activity messages each containing at least the identity value and the address of the respective network node, and each operational network node, on receiving an activity message, synchronizing its table with the contents of the activity message. The term synchronization shall be understood to mean, in particular, that the relevant entry in the table is at least updated when the contents of the activity message differ from the current contents in the entry. Equally, synchronization shall be understood to mean the generation of a new entry or creating information in an entry for the first time according to the contents of the corresponding activity message.

The method according to the invention is characterized in that each table of the individual network nodes contains information on all the other network nodes as a result of the transmission of activity messages, so that each network node can directly address other network nodes using the identity value and the corresponding address in the table. Hence, in the distributed communications network, each network node knows about the other network nodes, which is not the case in conventional distributed data networks. The search for resources is simplified by this means, because a relevant network node can be addressed directly and does not need to be located by time-consuming lookup techniques for network nodes. The method is particularly suitable for use in industrial applications, in which the number of network nodes is manageable compared with applications in the Internet, so that tables containing information on all the network nodes of the distributed data network can be managed without difficulty. At the same time, industrial requirements for the communication speed are satisfied, because each network node contains information on all the other network nodes, and hence searching for resources and corresponding network nodes can be performed far more quickly.

As already explained above, the method according to the invention is particularly suitable for use in a communications network of an engineering system having a plurality of engineering components. In such an engineering system, at least some of the engineering components are each assigned a device identity for accessing the engineering component, and a device identity is assigned at least one network node of the communications network. The device identity can be used to address a device in the communications network directly without addressing via the addresses of the network nodes. Direct communication via the device identities is often a requirement in industrial applications in order to be able to transmit commands rapidly to the relevant devices, for example in emergency situations. In order for the inventive method also to guarantee communication by means of the device identities, each entry in the table of the respective network nodes preferably also contains the device identity to which the network node corresponding to the entry is assigned. In this case, a respective activity message is used to communicate additionally the device identity that is assigned to the network node that is transmitting the respective activity message. By this means, in the method according to the invention, communication via the device identities is also made possible, with the device identity being kept up to date in the tables using the activity messages. Hence a table containing two types of keys is created, which can be used in the data network to search for resources or to address devices.

The method according to the invention can be used in any industrial applications. For example, the method can be used in voltage distribution systems, in particular in a substation, where the engineering components comprise, in particular, switching units in the voltage distribution system. Another application is a power generation system, in particular a turbine. Equally, the method can be used in automation systems, in particular in a production line.

In order to guarantee by simple means that the activity messages reach all the network nodes in the communications network, these messages are preferably transmitted into the communications network by the respective network node as broadcast messages.

In the communications network, a mechanism is preferably also provided by means of which it is established if an operational network node becomes inactive, with an inactive network node being characterized by the fact that it is no longer transmitting an activity message. An inactive network node may hence be a failed network node or a network node that has switched itself off or has been shut down. The mechanism for establishing whether a particular network node becomes inactive works specifically by monitoring via at least one monitoring node, which is assigned to the particular network node, whether the particular network node is transmitting activity messages, with the at least one monitoring node also being one of the network nodes of the communications network. In the event that the monitored network node is no longer transmitting an activity message, the at least one monitoring node transmits a deactivation message to all the other network nodes, where the deactivation message contains at least the identity value of the particular (monitored) network node. Like the activity messages, the deactivation message is preferably also transmitted into the communications network by the at least one monitoring node as a broadcast message. The at least one monitoring node is preferably a network node that is a neighbor of the monitored network node in the sequence of identity values, where preferably the two immediate neighbors having a smaller and larger identity value respectively than the monitored network node act as the monitoring nodes.

In another embodiment of the method according to the invention, the at least one monitoring node also identifies whether new network nodes become active in the communications network. In this case, if the monitoring node receives an activity message from a network node that is a new addition to the communications network or newly activated network node, the monitoring node checks whether the new network node is a new neighboring network node, where, if the new network node is a new neighbor, the monitoring node starts to monitor this network node. In this case, monitoring of the old neighboring node is preferably stopped. This guarantees that monitoring is always configured such that the monitoring nodes include at least the immediate neighbors of the monitored node. Instead of, or in addition to, using monitoring nodes, a network node can also monitor itself. In particular, when such a self-monitoring network node switches itself off, it transmits a deactivation message containing its identity value to all the other operational network nodes.

In another preferred embodiment of the invention, the table of a respective network node contains entries for all the identity values in the range, with a status field being used for each entry to indicate whether the network node of the entry is present in the communications network, or whether it is operational or inactive. If, in a respective network node, activity messages are being received from a network node that was previously not yet present in the communications network or was previously inactive, the corresponding entry in the table for the previously not yet present or previously inactive network node is synchronized with the contents of the activity message, and the status field of the corresponding entry is set to active.

In another embodiment of the method according to the invention, a respective network node, which receives a deactivation message, sets to inactive the status field of the entry of the network node given by the identity value in the deactivation message.

In a further embodiment of the method according to the invention, each operational network node is responsible for the sub-range of identity values between its identity value and the next larger or next smaller identity value of its operational neighbor node. If the status field of an entry in the table for the operational network nodes changes, the sub-ranges of the identity values for which the operational network nodes are responsible are also adapted on the basis of the changing identity values. By this means, a network node takes on a larger sub-range when another network node drops out, and a newly added network node takes on part of the sub-range of a network node that is already present.

In a particularly preferred embodiment of the method according to the invention, resources are published in the communications network by at least some of the network nodes, by means of one or more keywords assigned to a resource are mapped onto an identity value, with the resource or a link to the resource being saved on a publication node, where the publication node is the node that is responsible for the sub-range containing the identity value on which the keyword(s) is/are mapped. The term resource shall be taken to mean here any data that is to be saved and declared in the network. The identity values are in this case preferably hash values, with the keyword(s) being mapped onto the identity value by a hash function. Any hash function can be used here, with preferably the hash function being selected to achieve an even distribution of the resources on the network nodes. The Fowler/Noll/Vo (FNV) hash function, which is well-known from the prior art, is an example of one such hash function.

Preferably on publishing a resource, replications are made so that the resource or a link to the resource is saved on other nodes in addition to the publication node. Redundancy in the communications network is achieved in this way, so that if a network node fails, the resources saved there are not lost. In a particularly preferred embodiment, the additional network nodes used for replication are determined by adding prime numbers to the identity value of the publication node. Preferably, in the event that the responsibility of a network node for a resource in the communications network changes (for example on the addition or loss of network nodes), the resource is republished in the communications network.

Searching for resources in the communications network can be done particularly easily by means of a searching network node mapping the keyword(s) of the resource onto the identity value and using its table to identify the network node responsible for the resource. This network node can then be addressed by the searching network node via the address in the table of the identified network node.

The method according to the invention can be used in any distributed networks, with the preferred application being well-known peer-to-peer networks, in particular those networks having a logical ring structure, such as Chord for instance. The method according to the invention preferably constitutes an extension of the communications protocol for such peer-to-peer networks.

In addition to the method described above, the invention also includes a distributed communications network that is designed so that each of the variants described above of the method according to the invention can be performed in this network.

BRIEF DESCRIPTION OF THE DRAWINGS

Exemplary embodiments of the invention are described below in detail with reference to the enclosed figures, in which:

FIG. 1 shows an embodiment of a hash table used in the invention, as it appears at two different times in a peer-to-peer network;

DETAILED DESCRIPTION OF INVENTION

Figure 2:
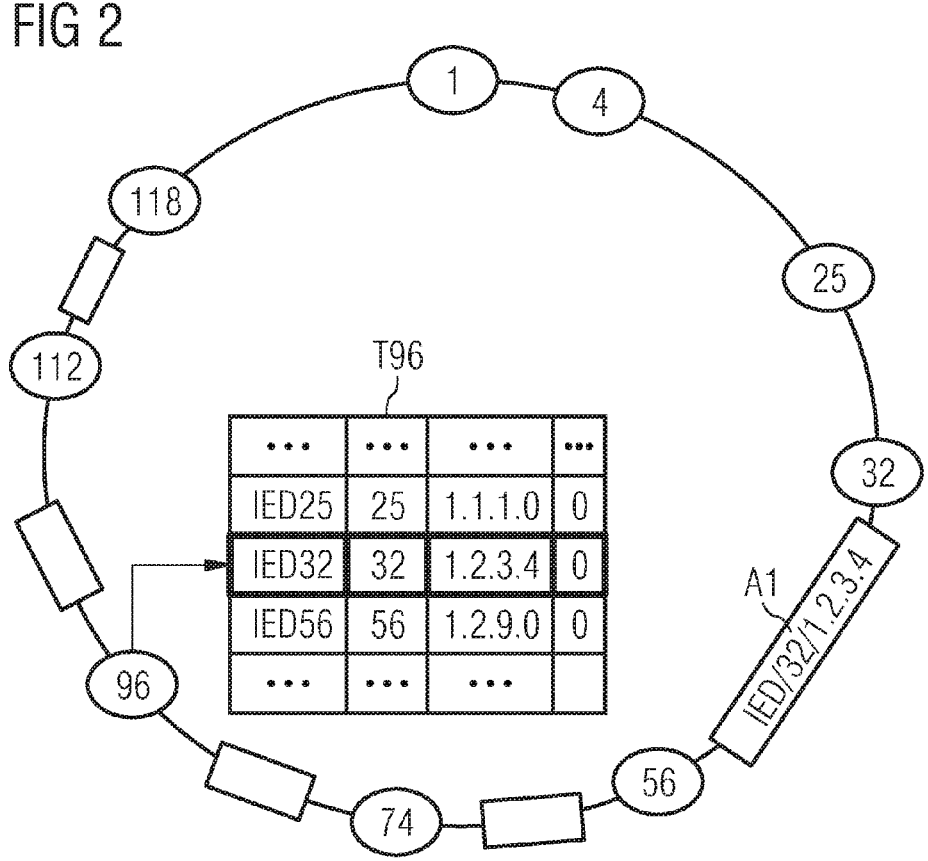
FIG. 2 and FIG. 3 shows diagrams of an embodiment of the peer-to-peer network according to the invention, which are used to explain the procedure of the method according to the invention.

The method according to the invention described below is used in a peer-to-peer network of an engineering system that constitutes an "embedded system", in which the individual components of the system also contain, in addition to their actual technical function, communication means in the form of a communications module and an appropriate CPU. Processing power is hence embedded in the devices, and the individual devices can communicate with each other via the communications modules. In this embedded system, a peer-to-peer structure is created between the individual components to enable decentralized management or control of the engineering system. One application of an engineering system is here a voltage distribution system, in which the individual components include high voltage switches. A peer-to-peer structure is now applied to this engineering system, taking due consideration of the fact that the protocol for communication between the individual peers must be improved compared with conventional peer-to-peer protocols, because the requirements relating to failures and to faster communication are far higher in industrial applications than in conventional applications of peer-to-peer networks in the Internet. In order to meet this requirement, a "double-key hash table" is used as the hash table in the invention. This hash table differs from conventional hash tables in that the hash table contains information on all the peers in the network, and two identities are saved for each peer, which can be used for communication between the engineering components of the system.

FIG. 1 shows an extract from the double-key hash tables used according to the invention in a peer-to-peer network, where each peer in the network manages such a table. The table T1 shows here the values it contains at the time when the relevant peer 1, which manages the table T1, connects to the network. The table T1' shows the status of the table when the relevant peer 1 has received information on all the peers in the network. In the embodiment described here, a peer-to-peer network is examined that has a logical ring structure, with a total of 128 binary hash values being used as the range. FIG. 1 shows the first eight entries of the hash table T1 and T1' respectively. The hash tables used in the embodiment described here have entries for each possible hash value, because each peer can adopt one of these hash values as an identity if applicable. The table shown in FIG. 1 hence has a total of 128 rows, with each row representing a hash value and being consecutively numbered from 1 to 128 with possible peer identities P_ID (second column from the left in the tables).

In addition to their peer identity P_ID, which equals a hash value, the individual peers in the peer-to-peer network are also characterized by a corresponding IP address or MAC address IP_ADDR (third column from the left in the tables), which enables the peers to be addressed for communication. Furthermore, each peer corresponds to an engineering component or a part of an engineering component of an engineering system, with each of the engineering components being characterized by appropriate identities in the form of IED_Names (first column on the left in the tables) (IED=Intelligent Electronic Device). The tables in FIG. 1 also contain a column containing status fields SB (fourth column from the left), in which the status of the corresponding peer of the row in question is displayed. Here SB=0 means that the peer is active or online, SB=1 means that the peer is inactive or has failed, and SB=255 means that as yet there is no peer having the corresponding peer identity in the peer-to-peer network.

At the time when the peer 1 becomes part of the data network, it has not yet received any information from other peers, so that the status field SB for all the entries is set to 255 as shown in table T1, and also there is no information contained in the columns IED_Name and IP_ADDR.

According to the embodiment described here of the method according to the invention, a peer receives information from other peers via broadcast messages transmitted by the other peers, as is explained in greater detail with reference to FIG. 2. These broadcast messages are transmitted by the peers and also received by peer 1 at regular time intervals. Once the peer 1 has received broadcast messages from all the active peers in the network, the table is in the state T1' shown in FIG. 1 and contains information for all active peers. Table T1' shows a scenario in which the peers having the peer identities 1, 4 and 7 are active, which is indicated by SB=0. For these peers, entries for IED_Name (for example E1Q1SB1 for the peer 4) and entries for IP_ADDR (e.g. 192.168.1.12 for the peer 4) are also contained in the relevant columns. In addition, there is a peer in the peer-to-peer network, which although is part of the network, has failed or is inactive. This is the peer 8, whose status field SB is accordingly set to 1. Furthermore, there are no peers in the peer-to-peer network that have the identities 2, 3, 5 and 6, which is indicated by the status field SB being set to 255. For these peers there are also no entries for IED_Name and IP_ADDR.

The advantage of using the hash table shown in FIG. 1 is that, unlike conventional peer-to-peer networks, each peer has, from its table, information on all the other peers, so that resources can be located very quickly in the data network by the fact that the IP address or MAC address of the peer containing the resources being sought can be identified from the table, and this peer can immediately be addressed directly. In contrast, in conventional peer-to-peer networks, individual peers only know about certain other peers in the network, so that time-consuming lookups have to be used to locate resources. Another advantage of the hash table shown in FIG. 1 is that it is also possible in certain situations to address an engineering component of the engineering system not via an IP address or MAC address but directly via the corresponding device name of the engineering component. Hence the engineering components can be accessed directly without a search process, something which may be necessary in emergencies, for example, when an engineering component is meant to perform an action or be switched off very quickly. Thus a network that uses the table shown in FIG. 1 is ideally suited to industrial applications.

FIG. 2 shows an embodiment of a peer-to-peer network according to the invention in the form of a logical ring structure of a Chord ring type, where in FIG. 2 a total of nine peers are part of the network, namely the peers having the numbers 1, 4, 25, 32, 56, 74, 96, 112 and 118. As already mentioned above, the peers transmit at regular intervals broadcast messages, which correspond to the activity messages in the sense of the claims. FIG. 2 shows here a scenario in which the peer 32 is currently transmitting an appropriate broadcast message, where the peer 96 has not yet received this broadcast message before, because, for example, it has only been a member of the network for a short time. The originally sent broadcast message is denoted by A1 in FIG. 2, with rectangles between the peers indicating the transmission of the broadcast message in the ring structure. As can be seen from FIG. 2, the broadcast message A1 contains the device identity IED32, the number of the peer 32 and a corresponding IP address 1.2.3.4. If the peer 96 now receives the broadcast message A1, it updates its relevant entry for the peer 32, i.e. the device identity IED32 and the IP address 1.2.3.4 are now entered in row 32 in table T96, and the status field is set to the status SB=0. Likewise the other peers in the data network, on receiving the broadcast message, check their corresponding table and update the entries with the contents of the broadcast message. Hence, as shown in FIG. 2, a simple mechanism is created by which all the peers can always store in their table up-to-date information on all the other peers in the network.

Figure 3:
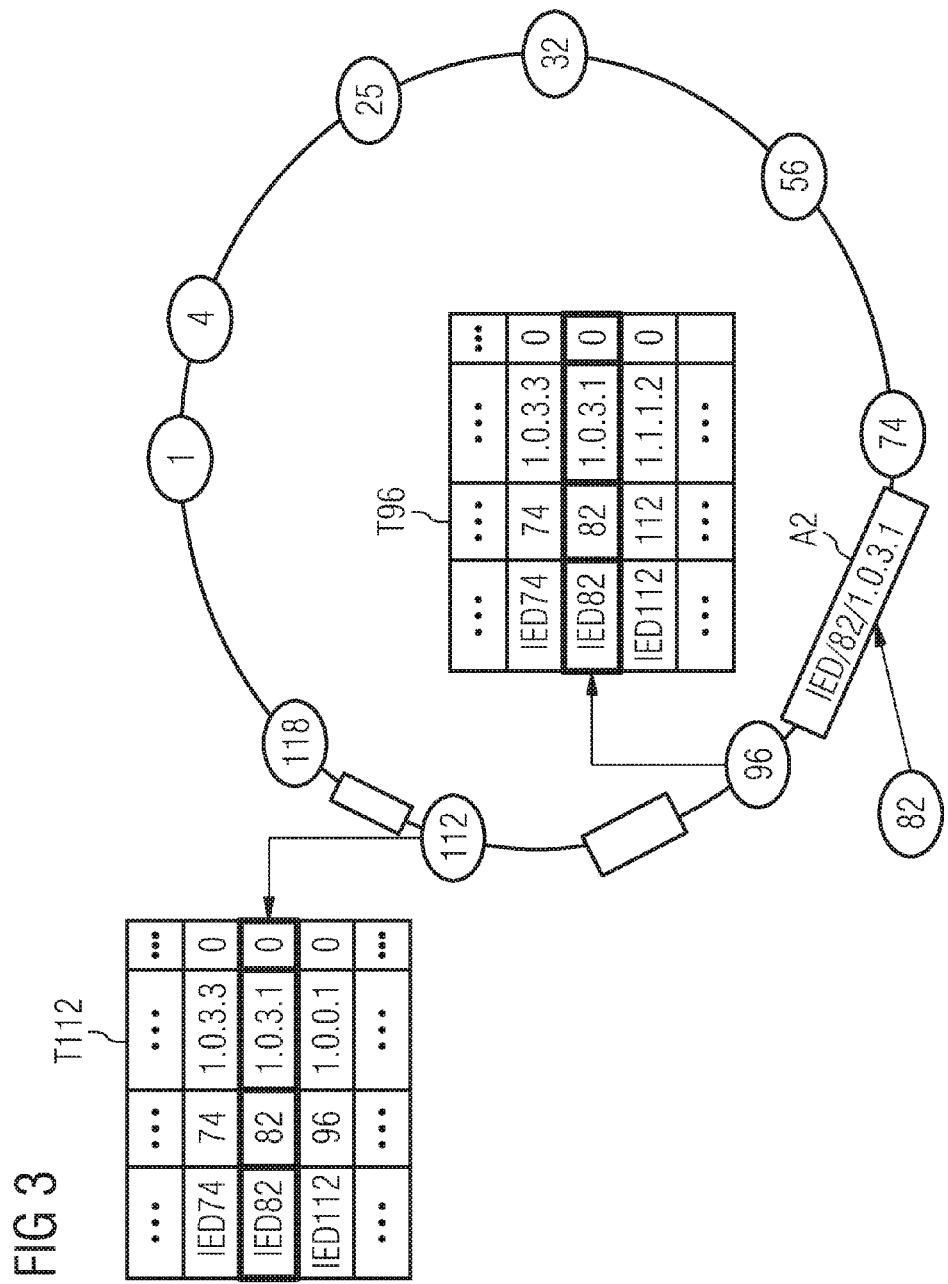

FIG. 3 shows the same peer-to-peer network as FIG. 2, with a new peer 82 now joining the peer-to-peer network. The new peer, which initially does not have the number 82, first receives over a preset time period the activity messages from all the other peers, and thereby generates the relevant entries in its hash table (not shown in FIG. 2). At the end of this period, the peer looks for a suitable identity value P_ID, that has not yet been taken by a peer in the network. In FIG. 2, the peer selects the peer identity 82 and then transmits as a broadcast into the peer-to-peer network its own activity message containing the peer identity 82, the device name IED82 assigned to it and its network address 1.0.3.1. The corresponding broadcast message is denoted by A2 in FIG. 2, with rectangles being used again to indicate the transmission of the message to other peers in the network.

FIG. 3 shows how the peer 96 updates its relevant entry in its table T96 with the information in the broadcast message A2. The same addressing is shown analogously for the hash table T112 of the peer 112. By transmitting the broadcast message A2 to all the peers in the network, the peer 82 is hence rapidly made known and can now be addressed directly via its entry in the individual hash tables.

Figure 4:
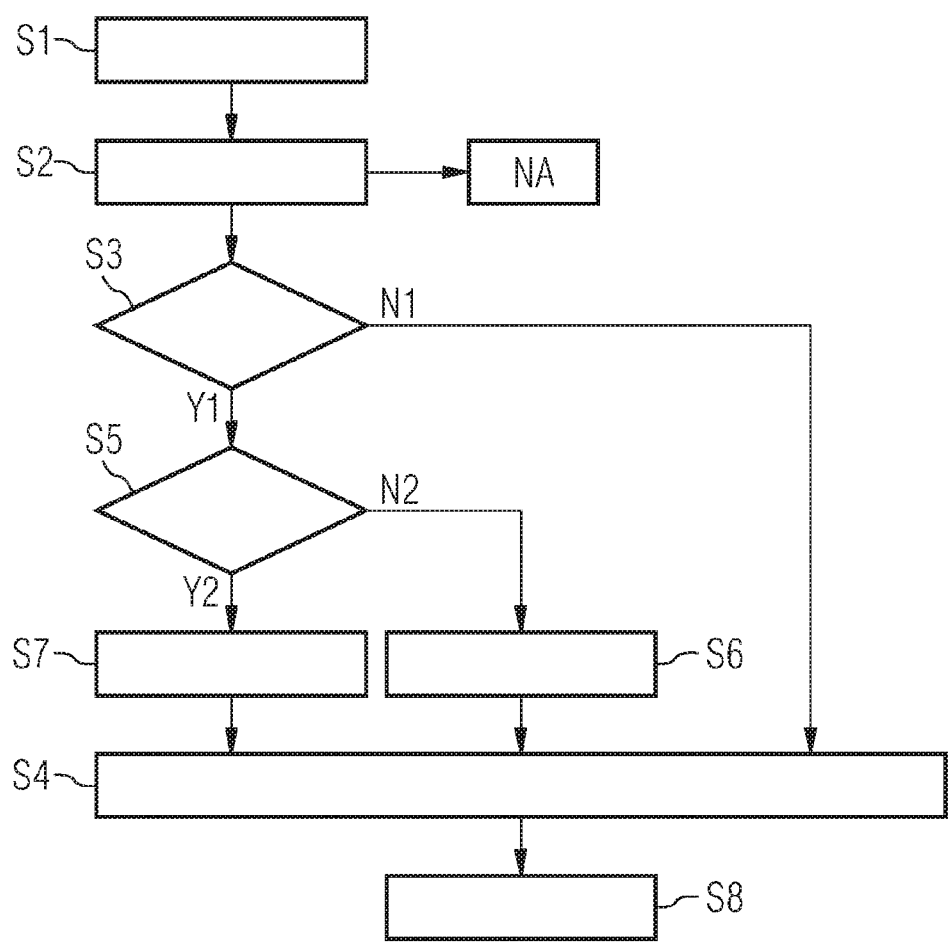
FIG. 4 shows a diagram illustrating the procedure of monitoring a peer by its neighbors according to an embodiment of the invention.

It is explained below with reference to FIG. 4 and FIG. 5 how it is possible to detect the failure or departure of a peer in the peer-to-peer network of FIG. 1 or 2. In the embodiment of the invention described here, a failure is detected by means of each peer monitoring the receipt of activity messages from the neighboring predecessor peer and successor peer given by the numbering of the peer identities. FIG. 4 shows such a monitoring procedure. In step S1 of FIG. 4, a monitoring peer receives an activity message from another peer. The peer then looks up the peer identity given in the received activity message in its hash table. This is done in step S2. In step S3, the monitoring peer checks whether the peer that is the source of the activity message is a neighboring network node to the monitoring peer based on its identity value. If this is not the case (branch N1), the contents of the activity message is saved in the appropriate entry of the hash table of the monitoring peer, and the status field of this entry is updated (step S4). If the peer that is the source of the message is a neighbor (branch Y1), however, a check is made in step S5 as to whether it is a new neighbor whose identity value lies between the identity value of the monitoring peer and of the old neighbor. If this is not the case (branch N2), it is the old neighbor that is already monitored, and monitoring is restarted in step S6. Then once again in step S4, the relevant entry in the hash table is updated, with no change being made to the values of the entry in this case.

Should it be found in step S5, however, that the peer that is the source of the activity message is a new neighbor (branch Y2), new monitoring is started for this new neighbor in step S7, and the old monitoring terminates. Then once again in step S4, the relevant entry in the hash table of the monitoring peer is updated. Once the procedure in step S4 is complete, monitoring is resumed in that the monitoring peer waits for the receipt of relevant activity messages (step S8).

Figure 5:
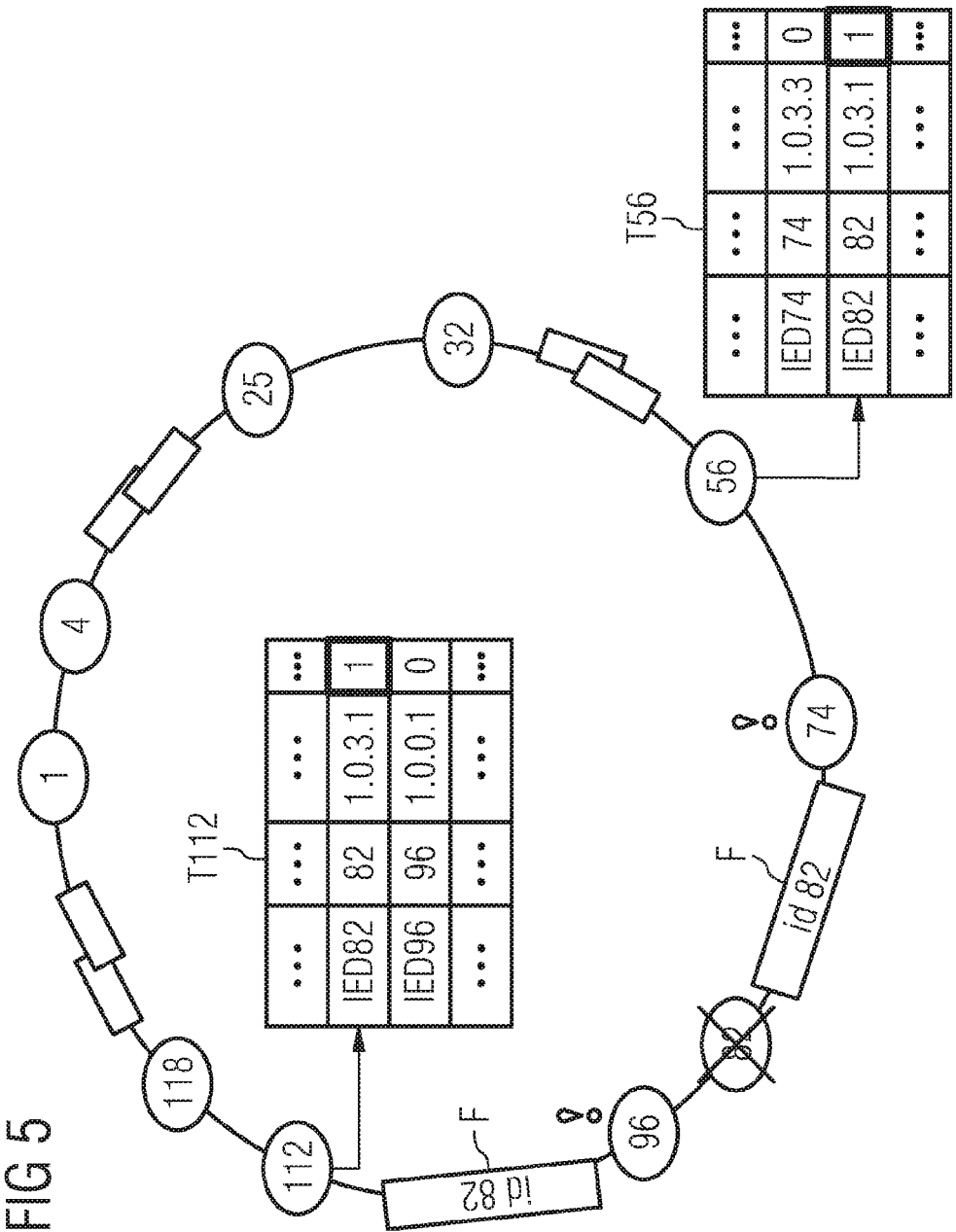
FIG. 5 shows a diagram of an embodiment of the peer-to-peer network according to the invention, which is used to explain how the failure of a peer is detected.

FIG. 5 shows a scenario in which the failure of the peer 82 is detected by the neighboring monitoring peers 74 and 96 in the peer-to-peer network. The failure is detected here by the monitoring peers establishing that no further activity message has been received from the monitored node for a preset time period. Once this has been established by the nodes 74 and 96, these nodes generate an appropriate failure message, which is denoted by F in FIG. 5 and contains the identity 82 of the failed network node. This message is transmitted both by peer 74 and by peer 96 as a broadcast message to all the other peers, as is again indicated by rectangles. The resultant action of the peers 56 and 112 on receiving the message F is also shown in FIG. 5. Each of these peers sets in its hash table T56 and T112 respectively the status of the entry of the peer identity 82 to inactive, i.e. to SB=1. It is optionally also possible that a peer that goes into a dormant state or switches itself off in a controlled manner itself transmits an appropriate failure message F containing its own identity.

Figure 6:
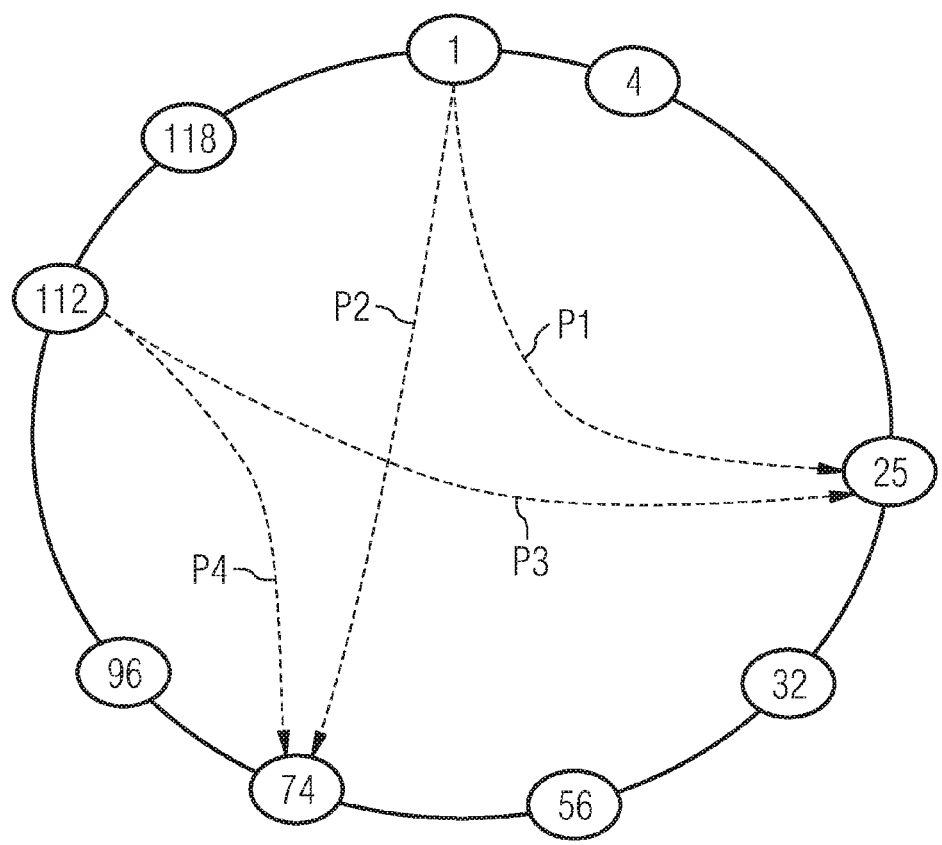
FIG. 6 shows a diagram of an embodiment of the peer-to-peer network according to the invention, which is used to explain how resources are published and located.

FIG. 6 illustrates how resources can be published and located according to the invention in the peer-to-peer network. The term resources shall be understood to mean here any data that the peers can access. Publishing a resource means that the resource itself or a link to the resource is saved in a peer, which is then responsible for the resource. To publish a resource, a corresponding keyword is used, which is assigned to the resource. In the example of FIG. 6, the peer 1 intends to publish the resource having the keyword K=IED1.SVC9.LD3.LN4. To do this, the keyword is converted to a hash value from the range 1 to 128 using an appropriate hash function. Any hash function can be used here. In a preferred embodiment, a function is used that distributes the resources evenly over all the peers. The Fowler/Noll/Vo (FNV) hash function, which is well-known to the person skilled in the art, is an example of such a hash function. Using the keyword K, the peer 1 calculates a hash value, which lies between peers 25 and 32. Since in the embodiment of FIG. 6, each peer is responsible for all subsequent identity values up to the next peer, it follows from this that the resource is published on the peer 25.

A replication mechanism is integrated in the embodiment of FIG. 6, whereby the resource is also replicated on an additional peer, whereby a replication group of two peers is formed for each resource, i.e. each resource is published on two peers. The additional peer for publishing the resource is calculated as the peer 74 using an algorithm, which is explained in greater detail with reference to FIG. 8. In FIG. 6, the arrows P1 and P2 are used to indicate the publication of the resource on the relevant peers 25 and 74.

FIG. 6 also shows the search for the resource using the keyword K by the peer 112. For the search, the keyword K is similarly converted into a corresponding hash value using the hash function, and then the peer responsible for the hash value is determined. In an analogous process to that of publication, the peer 112 now finds the peer 25 as the peer responsible for the resource. Since the hash table of the peer 112 already contains the IP address or MAC address of the peer 25, this peer can be addressed directly. The peer 112 can use a suitable algorithm to determine also the additional peer 74 on which the resource is also published. Since the IP address or MAC address of this peer is also saved in the hash table of the peer 112, it can also access the resource in the peer 74 directly. The search for resources by the peer 112 is indicated here by the arrows P3 and P4. As can be seen in FIG. 6, the search for resources in the peer-to-peer network according to the invention proves very simple, because each peer contains all the information on the other peers and hence a peer that is searching for a resource can address directly the peer that is responsible for the relevant resource.

Figure 7:
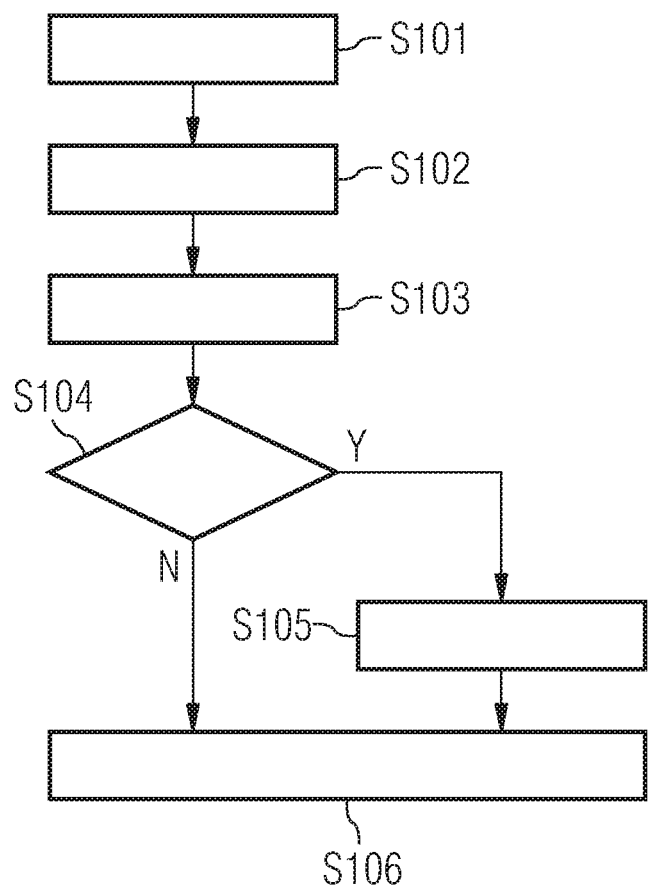
FIG. 7 shows a flow diagram illustrating the republication of resources when a peer fails in an embodiment of the method according to the invention.

FIG. 7 shows a flow diagram illustrating the actions of a peer that has published resources in the peer-to-peer network and has received a relevant deactivation message F as shown in FIG. 5. Here message F is received in step S101. The peer then looks up the corresponding peer identity in its table (step S102) and then marks the relevant entry in the table as inactive, i.e. SB=1 (step S103). Then the peer checks whether it has published resources from itself on the peer in the deactivation message F (step S104). If this is the case (branch Y), the peer initializes a new publication process and publishes the resources again in the network, as is shown by step S105. The republication of the data is here identical to the publication described with reference to FIG. 6, although the initiator is different. Then the peer waits as usual to receive activity messages in step S106. Should it be established in step S104 that the peer that has become inactive does not contain any resources that were published by the peer receiving the message F (branch N), the procedure moves on to step S106 without republishing.

Figure 8:
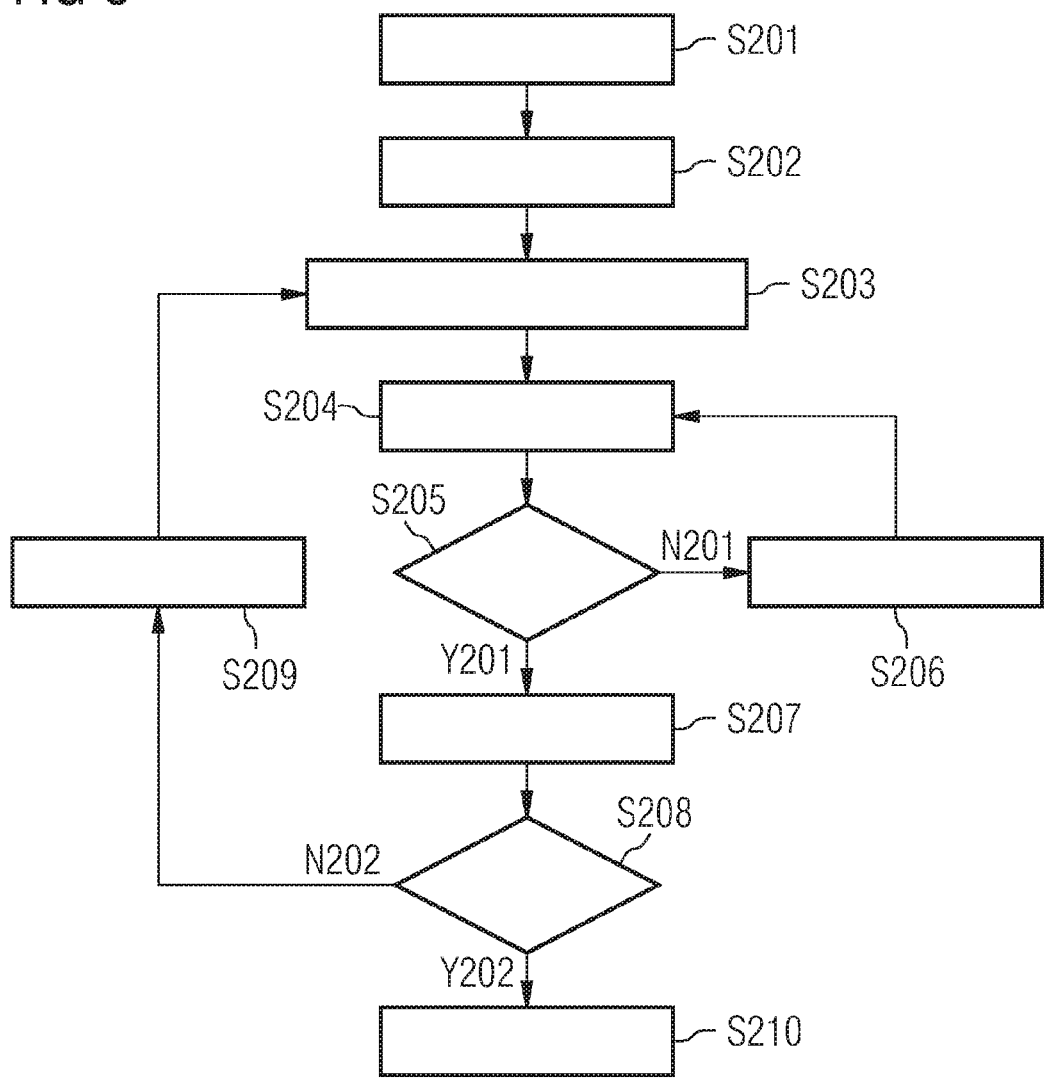
FIG. 8 shows a flow diagram illustrating the publication of resources on a plurality of peers of a replication group according to an embodiment of the method according to the invention.

FIG. 8 shows a flow diagram that illustrates the replication of published resources on a plurality of peers, which was already mentioned in the explanation of FIG. 6. FIG. 8 shows an iterative process, which is started in step S201 with the iteration value Iteration=0 and a fixed prime number magic_prime=const. First, the hash function is used to map the keyword of the resource accordingly to be published onto the hash value, which is done in step S202. The hash value is here denoted by hash_value and the keyword simply by keyword. In step S203, the peer identity on which the resource shall be published is calculated by an appropriate function add_circular (hash_value, Iteration·magic_prime). In the first iteration, this is the peer identity of the peer having the next smaller identity value compared with the hash_value.

In step S204, the peer identity is then looked up in the hash table of the publishing peer. Then in step S205, the entry in the hash table of the publishing peer is checked to see whether the peer is active. If this is the case (branch Y201), the peer identity is added to an appropriate list, where in the first iteration step, the peer identity is the first entry in this list (step S207). An appropriate function add(peer_id, peer_ids[ ]) is used to make additions to this list. If it is found in step S205, however, that the looked-up peer is not active (branch N201), the entry lying before it in the hash table is used as the peer identity, and the procedure goes back to step S204.

After adding the relevant peer to the list in step S207, a check is made as to whether the Iteration variable has already reached a preset replication factor (step S208). If this is not the case (branch N202), in step S209, the Iteration variable is incremented by one value. If the Iteration variable has reached the replication factor (branch Y202), all the peers in the list are output (step S210), and the resources are then published on these peers.

After incrementing the Iteration variable in step S209, the procedure returns to step S203, where now the prime number magic_prime, multiplied by the new value of the Iteration variable, is added to the calculated hash_value. The function add_circular used here, in this procedure takes account of the fact that the peer-to-peer network has a logical ring structure so that if the range of the hash values is exceeded, the addition is resumed at the beginning of the range. Using the prime number magic_prime in the procedure shown in FIG. 8 achieves a very even replication of resources within a replication group of peers, with the number of peers on which the resources are replicated being set by a corresponding replication number. Replication ensures, in particular, that the resources are stored redundantly in the peer-to-peer network, and that the resource is not lost if a peer fails.

The invention claimed is:

1. A method for operating a distributed communications network with a plurality of network nodes, each network node being assigned an identity value from a range of identity values and an address to communicate with other network nodes, and each network node being responsible for a sub-range of identity values from the range, comprising:
 managing a table by each operational network node, wherein the table is a double-key hash table containing an entry for each operational network node in the communications network, the entry comprising the identity value and the address of the respective network node, wherein the identity values equal hash values, and wherein the double-key hash table further comprises an engineering component identity for each network node, each engineering component identity corresponding to an engineering component or a part of an engineering component of an engineering system;
 sending regularly activity messages by each operational network node to the other network nodes of the communications network, the activity messages each containing the identity value, the address of the respective network node and the engineering component identity; and
 synchronizing the table by each operational network node, upon receiving an activity message, with the contents of the activity message,
 monitoring the network nodes in order to detect when a network node becomes inactive, the monitoring being performed via a monitoring node which is assigned to the network node,
 wherein the monitoring node monitors whether the network node is transmitting activity messages,
 wherein, when the network node is no longer transmitting activity messages, the monitoring node transmits a deactivation message to all the other network nodes, the deactivation message containing the identity value of the network node, wherein the inactive network node no longer sends activity messages, and wherein a network node receiving a deactivation message sets the status field of the entry of the network node given by the identity value in the deactivation message to inactive.

2. The method as claimed in claim 1, wherein the activity messages are transmitted into the communications network by the respective network node as broadcast messages.

3. The method as claimed in claim 1, wherein the deactivation message is transmitted into the communications network by the monitoring node as a broadcast message.

4. The method as claimed in claim 1, wherein the monitoring node is a network node that is a neighbor of the monitored network node in the sequence of identity values, and wherein two neighboring network nodes are the monitoring nodes of a monitored network node.

5. The method as claimed in claim 4, wherein the monitoring node, in the event that it receives an activity message from a network node that is a new addition to the communications network or newly activated network node, checks whether the new network node is a new neighboring network node, wherein, when the new network node is a new neighboring network node, the monitoring node starts to monitor the new network node.

6. The method as claimed in claim 1, wherein a network node transmits a deactivation message containing its identity value to all the other operational network nodes when the network node becomes inactive.

7. The method as claimed in claim 1, wherein the table of a network node contains entries for all the identity values in the range, a status field being used for each entry to indicate whether the network node of the entry is present in the communications network or operational or inactive.

8. The method as claimed in claim 7, wherein, in case a network node receives activity messages from a network node that was previously not yet present in the communications network or was previously inactive, the corresponding entry in the table for the previously not yet present or previously inactive network node is synchronized with the contents of the activity message, the status field of the corresponding entry being set to active.

9. The method as claimed in claim 7, wherein each operational network node is responsible for the sub-range of identity values between its identity value and the next larger or next smaller identity value of its operational neighbor node.

10. The method as claimed in claim 9, wherein, when the status field of an entry in the table for the operational network nodes changes, the sub-ranges of the identity values for which the operational network nodes are responsible are adapted based upon the changing number of operational network nodes.

11. The method as claimed in claim 1, wherein resources are published in the communications network by some of the network nodes by a keyword assigned to a resource being mapped onto an identity value, the resource or a link to the resource being saved on a publication node, which is the network node that is responsible for the sub-range containing the identity value on which the keyword is mapped.

12. The method as claimed in claim 1, wherein a keyword of the hash values is mapped onto the identity value by a hash function, and wherein the hash function is selected to achieve an even distribution of resources on the network nodes.

13. The method as claimed in claim 11, wherein on publishing a resource, a replication is made so that the resource or a link to the resource is saved on other network nodes in addition to the publication node.

14. The method as claimed in claim 13, wherein the additional network nodes are determined by adding prime numbers to the identity value of the publication node.

15. The method as claimed in claim 11, wherein, when the responsibility of a network node for a resource in the communications network changes, the resource is republished in the communications network.

16. The method as claimed in claim 11, wherein searching for resources in the communications network is done by a searching network node mapping the keyword of the resource onto the identity value and using its table to identify the network node responsible for the resource, this network node being addressed via its address in the table.

17. A distributed communications network, comprising:
a plurality of network nodes, each network node being assigned an identity value from a range of identity values and an address to communicate with other network nodes, and each network node being responsible for a sub-range of identity values from the range,
wherein the communications network is configured such that
each operational network node manages a double-key hash table containing an entry for each operational network node in the communications network, the entry comprising the identity value and the address of the network node, wherein the identity values equal hash values, and wherein the double-key hash table further comprises engineering component identities for each network node, each engineering component identity corresponding to an engineering component or a part of an engineering component of an engineering system,
each operational network node regularly sends activity messages to the other network nodes of the communications network, the activity messages each containing the identity value, the address of the network node, and the engineering component identity, and
each operational network node, upon receiving an activity message, synchronizes its table with the contents of the activity message,
wherein each network node is monitored in order to detect when a network node becomes inactive via a monitoring node which are assigned to the network node,
wherein the monitoring node monitors whether the network node is transmitting activity messages,
wherein, when the network node is no longer transmitting activity messages, the monitoring node transmits a deactivation message to all the other network nodes, the deactivation message containing the identity value of the network node,
wherein the inactive network node no longer sends activity messages, and
wherein a network node receiving a deactivation message sets the status field of the entry of the network node given by the identity value in the deactivation message to inactive.

18. The method as claimed in claim 1, wherein the engineering system comprises a voltage distribution system, and wherein components of the engineering system comprise switching units in the voltage distribution system.

19. The method as claimed in claim 18, wherein the engineering system comprises a power generation system, in particular a turbine, and/or an automation system, in particular a production line.

* * * * *